United States Patent Office 3,256,780
Patented June 21, 1966

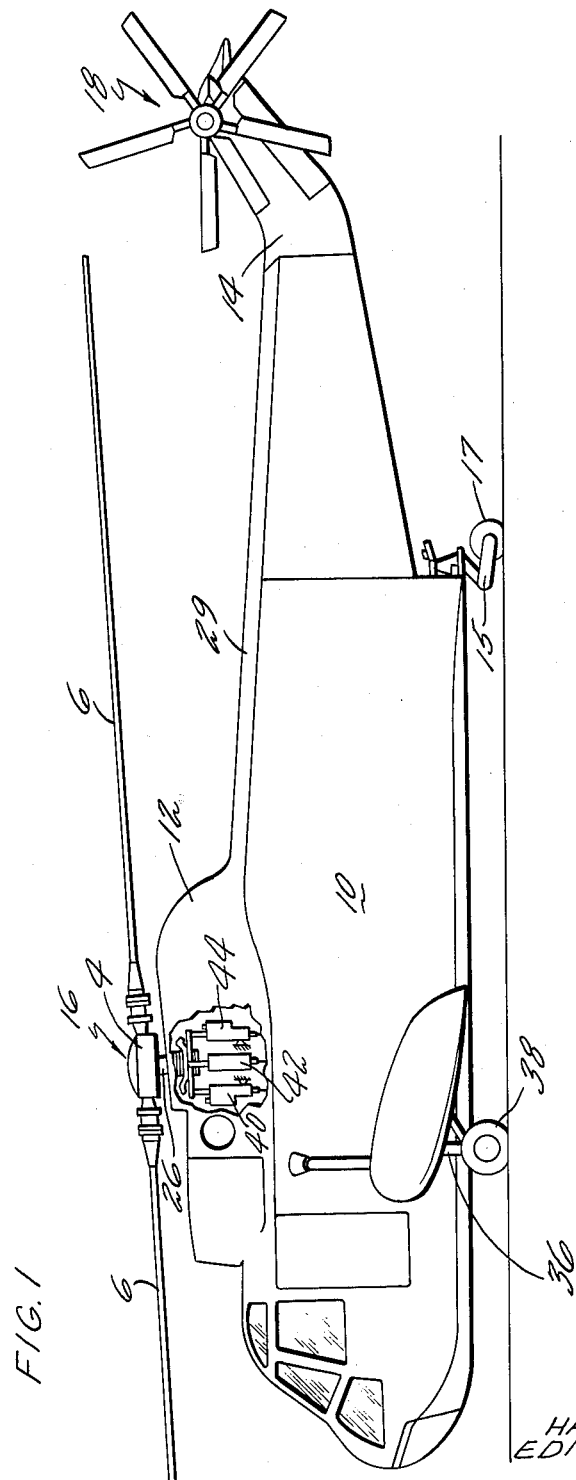

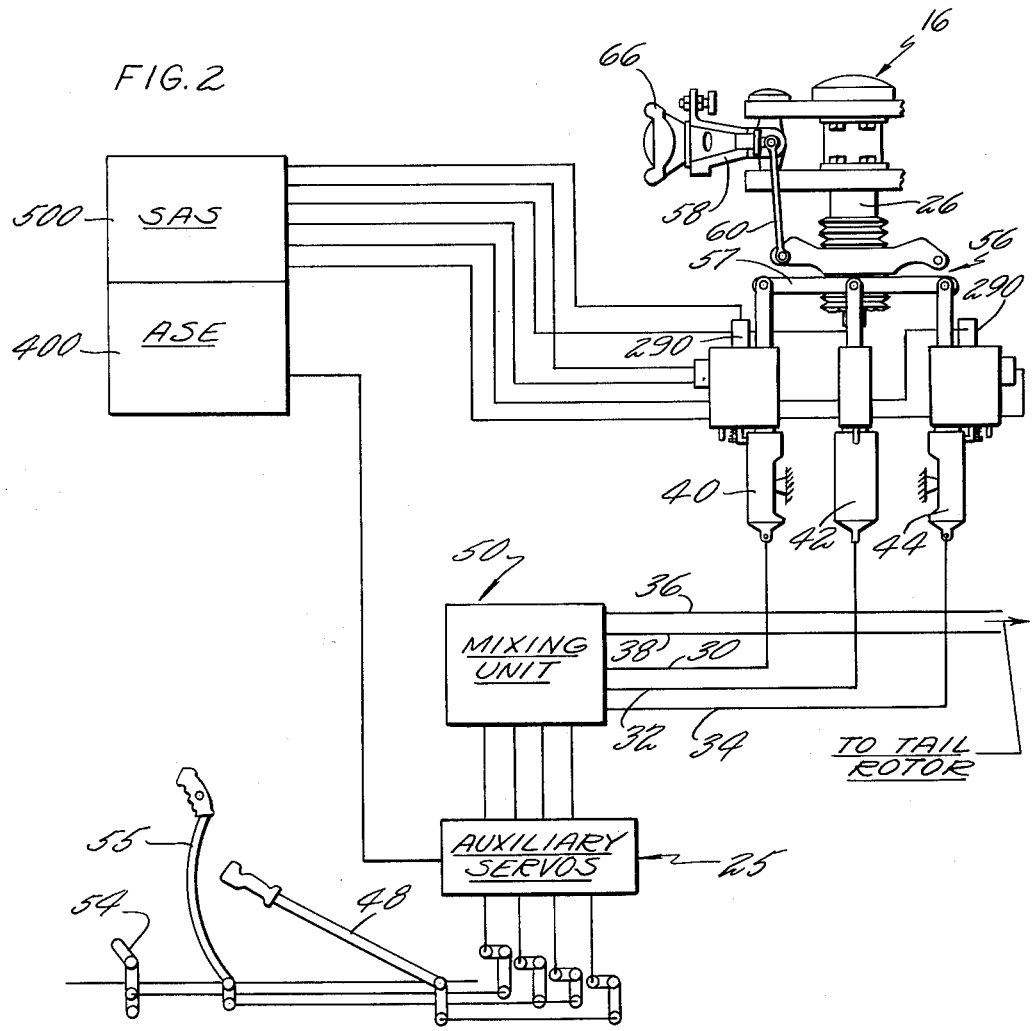

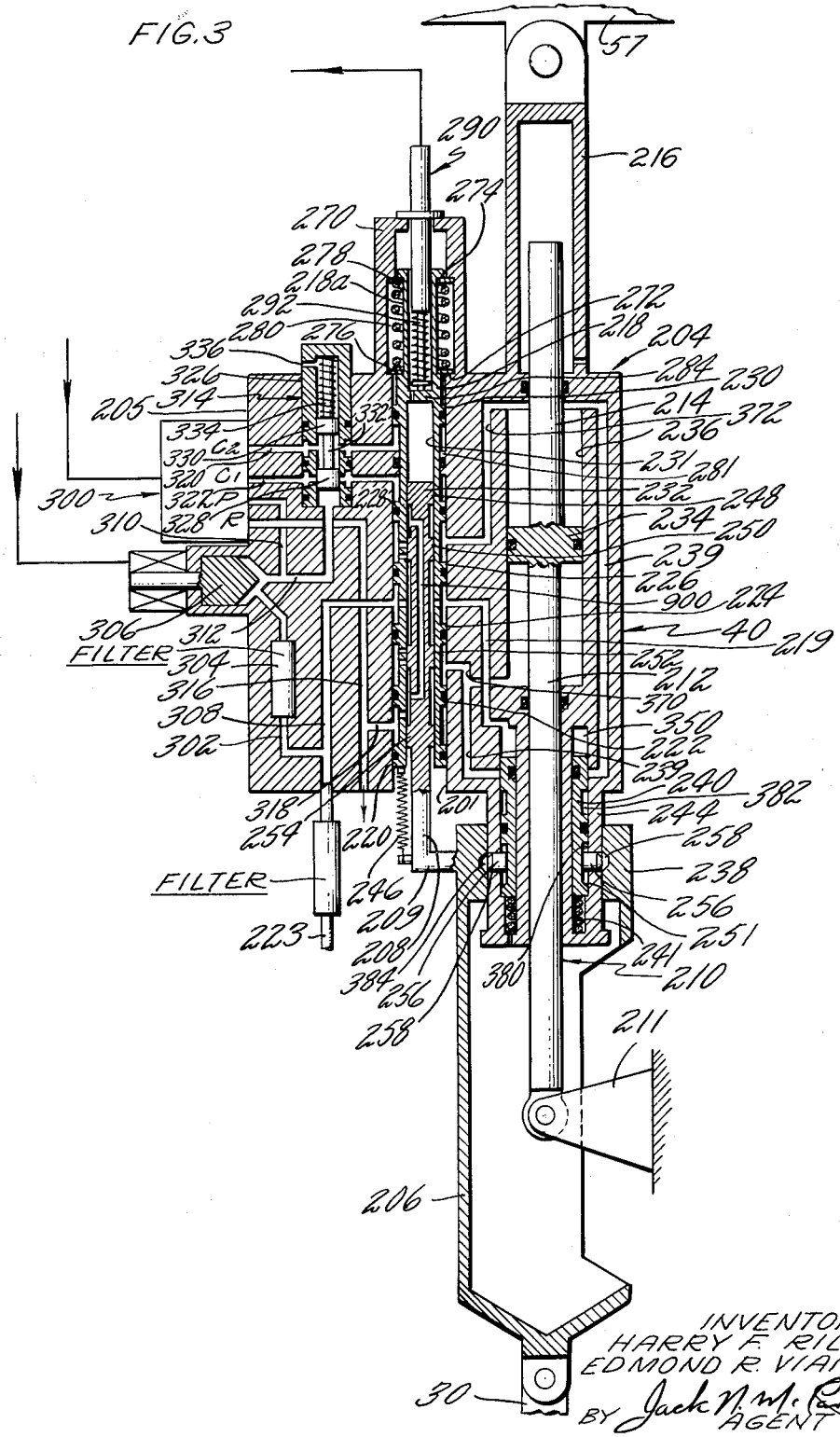

3,256,780
DUAL INPUT SERVO CONTROL MECHANISM
Harry F. Riley, Southport, and Edmond R. Vianney, Milford, Conn., assignors to United Aircraft Corporation, East Hartford, Conn., a corporation of Delaware
Filed Dec. 10, 1963, Ser. No. 329,476
5 Claims. (Cl. 91—216)

This invention relates to a dual input servo control mechanism wherein the servomechanism is capable of being operated by two inputs.

An object of this invention is to provide a servomechanism which is capable of accepting a mechanical and an electrical input to produce a single mechanical power-boosted output.

Another object of this invention is to provide a dual-input sermomechanism in which the boosted mechanical output is axially disposed relative to the mechanical input.

Another object of this invention is to take an electrical input signal and by transducing it, provide a boosted output displacement which is algebraically additive to that output associated with the mechanical input.

Another object of this invention is to provide an automatic slop-eliminator assembly which produces direct mechanical continuity between the servo input and output following removal of hydraulic pressure.

A further object of this invention is to provide continuous normal mechanical input servo operation following loss or removal of the electrical input.

Other objects and advantages will be apparent from the specification and claims and from the accompanying drawings which illustrate an embodiment of the invention.

FIG. 1 is a side elevational view of a helicopter with a portion broken away to show the location of the dual input servo control mechanisms.

FIG. 2 is an enlarged view showing the dual input servo control mechanisms connected between aircraft structure and a swashplate with actuating means therefor shown schematically.

FIG. 3 is an enlarged sectional view of a dual input servo control mechanism.

Referring to FIG. 1, the helicopter embodying the invention comprises essentially an elongated fuselage 10 having a main rotor pylon 12 and a tail rotor pylon 14 on which are mounted the main rotor generally indicated at 16 and a tail rotor generally indicated at 18. The main rotor 16 comprises a rotor head 4 having rotor blades 6 mounted thereon for pitch changing movement. Rotor head 4 is rotated by a rotor shaft 26.

In the helicopter structure shown, two jet engines are mounted side by side in a housing on the fuselage in front of the main rotor pylon 12. These two engines provide the powerplant section having an output drive from therebetween. This drive in turn drives rotor shaft 26 and the tail rotor drive shaft. A tail rotor drive shaft housing 29 covers this shaft. The helicopter is supported on the ground by landing gear including main struts 36 and wheels 38 and a tail strut 15 and wheel 17. A similar helicopter structure with a conventional type primary servo is shown in application Serial No. 171,331, filed February 2, 1962, for a Flight Control System to James C. Dean et al.

The control system shown in FIG. 2 comprises five main parts. These parts are: (1) a main rotor system, (2) the pilot's controls and devices which directly transmit movements of the controls, (3) dual input servo control mechanisms, (4) automatic stabilization equipment (ASE), and (5) a stability augmentation system (SAS).

The main rotor system in addition to the rotor head 4 and the rotor blades 6 mounted thereon for pitch changing movement, includes a swashplate assembly 56 having an upper rotatable swashplate member and a lower stationary swashplate member 57. The upper rotatable swashplate member is connected to the blade pitch changing horn 58 of each blade by a link 60. The blade pitch changing horn 58 extends from the blade attaching sleeve 66 of each blade 6. A rotor head and associated swashplate assembly of this type are shown in more detail in U.S. Patent No. 2,774,553 to H. T. Jensen for Damper By-Pass for Lag-Lead Control of Helicopter Rotor Blades.

The pilot's controls comprise normal helicopter controls such as a collective pitch stick 48, a cyclic pitch stick 55 and tail rotor foot control pedals 54. The devices include the bell cranks, interconnecting linkages, auxiliary servos 25, mixing unit 50, output linkages 30, 32 and 34, and output cables 36 and 38.

Actuation of the collective pitch stick 48 moves all three linkages 30, 32 and 34 through the auxiliary servos 25 and mixing unit 50. These linkages in turn move one input of the dual input servo control mechanisms in a manner to be hereinafter described.

Actuation of the cyclic pitch stick 55 in a fore-and-aft direction moves linkage 32 which will move one input of dual input servo control mechanism 42 in a manner to be hereinafter described. Actuation of the cyclic pitch stick 55 in a lateral direction moves the linkages 30 and 34 so that they actuate one input of dual input servo control mechanisms 40 and 44 in a manner to be hereinafter described. Actuation of the tail rotor foot control pedals 54 moves the control cables 36 and 38 which are connected to the tail rotor to achieve proper movement thereof.

Dual input servo control mechanism 40 is pivotally mounted to helicopter structure with its output rod connected to the stationary swashplate member 57 at a point which will move the swashplate assembly in a proper manner to achieve lateral control. The dual input servo control mechanism 44 is located at a point 180° from the dual input servo control mechanism 40 and is pivotally mounted to helicopter structure with its output rod connected to the stationary swashplate member 57 at a point which will move the swashplate assembly in the same direction as the dual input servo control mechanism 40. A dual input servo control mechanism 42 is pivotally mounted to helicopter structure with its output rod connected to the stationary swashplate member 57 at a point which will move the swashplate assembly in a proper manner to achieve longitudinal control. A conventional scissors is positioned between the stationary swashplate member 57 and helicopter structure to maintain it in its stationary position, that is, maintain it against rotation.

Since each dual input servo control mechanism is similar, only one will be described.

As viewed in FIG. 3, each dual input servo control mechanism comprises a piston unit 210, a cylinder unit 204, and an actuating mechanism located in a housing 205 affixed to cylinder member 204 and employed to place the dual input servo control mechanism in one of its three modes of operation.

Piston unit 210 has a piston member 234 which is slidably movable within cylinder 236 of the cylinder unit 204. A piston rod 212 extends through the bottom end of the cylinder 236 and has a free end extending below the cylinder 236 and has a free end extending below the cylinder unit 204. A piston rod 214 extends upwardly from piston 234 and is guided in the cylinder unit 204. The lower end of the piston rod 210 is pivotally mounted to a bracket 211 which is fixed to aircraft structure. The cylinder unit 204 has an upwardly extending cylindrical arm 216 which has its free end pivotally connected to the stationary swashplate member 57. Piston rod 214 extends into cylindrical arm 216 and is coaxial therewith. A sleeve 218 is located in a cylindrical bore 201 which extends through housing 205, said bore having its axis parallel to the axis of cylinder 236 and piston member 234. This sleeve member 218 has a sealed land 220 at its bottom end and five more successive sealed lands 222, 224, 226, 228 and 230 along its upward length. These lands provide a series of five annuli along the length of the sleeve. Sleeve 218 has a cylindrical bore 231 extending between the land 220 and a point above land 230. A pilot valve 232 is positioned in the bore 231 of said sleeve 218 and has its lower end 208 connected by an arm 209 to an actuating cylinder 206. Cylinder 206 has one end 238 mounted for slideable movement on an extension 244 of the cylinder unit 204. A spring 246 extends between cylindrical member 206 and sleeve 218. This spring partially compensates for the weight of the manually operative link mechanism.

A cylindrical housing member 270 extends upwardly over the open end of bore 201. The cylindrical housing joins the main housing 205 so as to form a shoulder 272, and the outer end is formed having a bore of reduced diameter providing a second shoulder 274. Sleeve 218 has a portion 218a extending above land 230 into the housing 270. The sleeve is necked down at this point to provide shoulders 276 and 278 which are the same distance apart as shoulders 272 and 274. A spring 280 is placed around the extension 218a between the lower annular shoulders 272 and 276 and the upper annular shoulders 274 and 278. A valve seat washer is placed between each end of the spring and its respective shoulders. It can be seen that this spring maintains the sleeve 218 in a null position, such as the position shown in FIG. 3.

The pilot valve 232 has a series of lands 248, 250, 252 and 254. These lands provide a series of three annuli along the length of the valve. The annulus formed at each end of the valve is connected by a passageway 900 extending through the inside of the valve.

In the null position shown in FIG. 3, a hole connects the upper part of the annulus between lands 220 and 222 with the annulus formed between lands 254 and 252. Two openings located adjacent to each other extend through the top part of the annulus formed between lands 222 and 224 and engage the surface of land 252. The annulus between the lands 224 and 226 is connected to the annulus between lands 252 and 250 by a series of holes.

The annulus between the lands 222 and 224 of the sleeve 218 is connected to the lower end of the cylinder 236 below the piston member 234 by a passageway 370. The annulus between the lands 226 and 228 of the sleeve 218 is connected to the top of the cylinder 236 above the piston member 234 by a passageway 372. To increase the length of the dual input servo control mechanism 40 it is necessary to direct a pressure to passageway 372 and connect passageway 370 to a return. Since the piston member 234 is fixed in relation to the aircraft by the connection of the piston rod 212 to the bracket 211, the cylinder unit 204 along with the upwardly extending arm 216 will move upwardly which will increase the length of the unit. To decrease the length of a mechanism 40 it is necessary to direct a pressure to passageway 370 and connect passageway 372 to a return. A passageway 239 connects one end of cylinder 236 with the other end. A valve member is located in said passageway to control the passage of fluid therethrough which will be hereinafter described. The annulus between lands 226 and 228 has two openings located adjacent to each other extending through the bottom part thereof which engage the surface of land 230. The annulus between the lands 228 and 230 is engaged by an annulus projection 281 on the housing 205 at its center part with a sealing ring engaging both the bottom of the annulus and the projection 281.

The sleeve 218 has an inner web 284 located just above the location of the land 230. An opening therethrough connects both inner ends of sleeve 218.

A transducer unit 290 is fixed to the end of cylindrical housing member 270 by a flange and extends into said cylindrical member and into the extension 218a of the sleeve 218. The transducer unit is a standard unit and has its inner movable core 292 fixed so as to be movable with the web 284 of the sleeve 218. It can be seen that movements of the sleeve 218 will move the core 292 of the transducer unit and put out an electrical output proportional to the displacement thereof. This output is fed back to an amplifier in the SAS. An electromechanical transducer of this type is commercially available. The International Resistance Company is a producer of linear variable differential transformers of this type.

An electrohydraulic valve 300 is fixed to housing 205 to direct a fluid pressure to one side or the other of projection 218 in bore 201. The electrohydraulic valve 300 has one connection to a return, which can be to a reservoir or a drain, one connection to a fluid pressure, one connection to bore 201 on the bottom side of projection 281 and a connection to the bore 201 above the projection 281.

Fluid pressure is brought into main housing 205 by conduit 223. The fluid from conduit 223 takes two paths within the housing 205. One path is by a passageway 302 and filter 304 to a pilot controlled solenoid operated hydraulic shutoff valve 306. The other path consists of a passageway 308 which is connected to the center of the annulus formed between the lands 224 and 226.

From the shutoff valve 306 the pressure takes two paths, one passageway 310 leads to the pressure inlet of the electrohydraulic servo valve 300 while the other path consists of a passageway 312 which leads to a valve 314, the operation of which will be hereinafter described. A passageway 316 in housing 205 connects the return connection of the electrohydraulic valve 300 to the exterior of the housing and a passageway 318 is connected to passageway 316 so that the annulus between lands 220 and 222 is connected to the exterior of the housing. The passageway 318 may be connected by a conduit to a reservoir in the system. One outlet $C_2$ from the electrohydraulic servo valve 300 is connected by a passageway 320 to the annulus between projection 281 and land 230. A second passageway 322 connects outlet $C_1$ of the valve 300 to the annulus between the projection 281 and the land 228.

A valve 314 is connected to passageways 320 and 322 by having a valve body 326 positioned in a bore which intersects both of the passageways. The valve body is formed as a cylinder and has a movable valve member therein with two lands 328 and 330. The lands are connected by a stem 332 and have a spring guide and stop 334 extending upwardly from the top of land 330. A spring 326 extends around the guide 334 and abuts the top of land 330 and the inner end of body member 326. This portion of the valve is vented at 336. The passageway 312 which extends from the shutoff valve 306 enters the end of the bore in the housing and is directed against the flat end face of land 328. Where the valve body 326 meets the passages 320 as they intersect the bore in which the valve body 326 is located, an annulus is formed so that the passageways 320 and 322 are always through passageways. Small radial holes connect each annulus to the interior of the cylindrical valve body.

It can be seen that when shutoff valve 306 is open, the pressure in line 312 will move the movable portion of the valve 314 upwardly until stop 334 meets the inner portion of the valve body. In this position, the land 328 is located so that passageway 322 is not connected to passageway 320 and they each contain their own flow separately. The annulus around the outer part of the valve body which cooperates with each of the passageways 320 and 322, insures that each passage is always an open passage. When the pressure in passageway 312 drops below an operating value, the movable valve member is moved downwardly by spring 334 and passageway 320 is then connected to passageway 322. This equalizes the pressure acting an lands 228 and 230 and permits spring 280 to position the sleeve 218 in its null position.

The electrohydraulic servo valve 300 receives its operating signal from an amplifier in the SAS. Depending on the signal, which will indicate a movement of the gyro in one direction or the other, the valve will direct a pressure to either $C_1$ or $C_2$. A valve of this type is commercially available. The Moog Valve Company, Inc. is a producer of electrohydraulic servo valves of this type.

As stated hereinbefore, cylinder 206 has one end 238 mounted for slidable movement on an extension 244 of the cylinder unit 204. This provides for the movement of the servo by the linkage 30. However, in the event of a hydraulic failure, it would be desirable to move the blades directly through the dual input servo mechanism. In this event, the member 206 when moved would move the upwardly extending cylindrical arm 216, and since this connection is desired to be one in which the arm 216 will move directly with movement of actuating cylinder 206, it is necessary that the two members be fixed together to take out any "slop" between them which is put in to permit servo actuation.

An annular chamber 350 is formed coaxially with and around the piston rod 212. An annular valve and cam member 240 is positioned in said annular chamber 350 for reciprocal movement therein. A spring 241 is positioned in the annular chamber between the lower end of the member 240 and the bottom of the annular chamber formed in the housing 205. A pressure line 219 enters the top of the annular chamber 350 to act on the annular top of member 240. The other end of passageway 219 is connected to the annulus between lands 224 and 226.

The annular valve and cam member 240 comprises a land at its upper end, a land at its center section and a flange at its lower end having a conical face 252 extending downwardly. A plurality of cam followers 256 are positioned in openings 258 in the sides of the extension 244. These cam followers are used to fix the actuating cylinder 206 to the cylinder unit 204 to make the mechanism 40 a fixed length link.

When a pressure exists in passageway 219, valve and cam member 240 is located in its lowermost position with the upper land closing off the passageway 239. The cam surface 252 is also placed in its lowermost position and the spring 241 is fully compressed. Annulus 380 formed between the land at the center section and the conical cam face 252 is positioned so as to receive the inner ends of the cam followers 256. They are of such a length so as not to protrude beyond the outer circumference of the extension 244 when the inner ends are against the bottom of the annulus 380.

When there is a loss of pressure in passageway 219, valve and cam member 240 is biased to its uppermost position by the spring 241. In this uppermost position, the annulus 382 located between the land at its upper end and the land at its center section connects one section of passageway 239 to the other section so that a through passageway exists. At the same time, the cam surface 22 is spring biased against the cam followers 25 and biases them outwardly. An annulus 384 is formed around the inner side of the end of 238 of the cylinder 206. This annulus is open to the outer face of the extension 244 and is formed having a bottoming surface having approximately the same width as the cam followers 256 with the sides tapering outwardly to form camming surfaces. If the annulus 384 is not opposite the cam followers 256, the cylinder 206 and extension 244 are moved relatively until the cam followers move into the annulus and are held in that position by the flange at the lower end of the member 240.

The automatic stabilization equipment (ASE) 400 can be one of many types of equipment available for use on aircraft of the type disclosed in this project. For example, automatic stabilization equipment such as shown in U.S. Patent No. 3,037,722, issued June 5, 1962, for a Gyro Stabilizer for Helicopter could be used. While the system in this patent is shown connected to the primary servo system, it can be connected in the same manner to an auxiliary servo system 25.

The stability augmentation system (SAS) 500 can be one of many types of equipment available for use on aircraft of the type disclosed in this project. For example, a stability augmentation system similar to that shown in U.S. Application Serial No. 284,707, to Charles B. Brahm et al., filed May 31, 1963, now patent No. 3,199,013, could be used. While the system is shown with a regular servo unit, it could be adapted for use with a dual input servomechanism such as disclosed herein.

*Operation*

It can be seen that there are three modes of operation available with the use of the dual input servomechanism 40 such as shown in FIG. 3:

(1) A signal from the SAS can move the upwardly extending arm 216,
(2) Movement of cylinder 206 will move upwardly extending arm 216 hydraulically if fluid pressure is available, and
(3) Movement of cylinder 206 will move upwardly extending arm 216 by a direct connection thereto when a fluid pressure is not available.

Considering the first mode of operation, when the pilot desires the SAS to be available for use he moves a cockpit control to open the shutoff valve 306. This permits pressure to enter the electrohydraulic valve 300 and positions the valve 314 so that the passageway 320 and 322 are separate. Now, considering the roll attitude of the aircraft, when it rolls to one side and a signal is put out by the gyro of the SAS, it is directed to an electrical system which amplifies the signal and directs it to the electrohydraulic valve 300 of the dual input servomechanisms 40 and 44. The electrohydraulic valves of these two units are set up so that the same signal directs pressure to $C_1$ of one unit and $C_2$ is connected to a return and the other unit has a pressure directed to $C_2$ and $C_1$ is connected to drain. In this manner, the dual input servomechanisms 40 and 44 work together to actuate the swashplate 56.

The operation of one mechanism will now be described. As a fluid pressure builds up in passageway 322 and in the annulus between projection 281 and land 228, and since passageway 320 is connected to return, the sleeve 218 is moved downwardly. As the sleeve 218 moves downwardly, the core 292 of the transducer moves from a null position and follows the movement of the sleeve and puts out a signal from the unit 290 which is fed back into the SAS to cancel out the signal being transmitted from the amplifier. As this is done, the lower opening which is connected to the annulus between lands 226 and 228 and engages the end of land 250, moves off of the land 250 and is connected to the annulus between land 250 and land 252. This permits the pressure in this annulus to pass through the opening into the annulus between lands 226 and 228 to passageway 372. From this passageway, the fluid pressure is directed into the upper part of cylinder 236 above piston member 234.

Since the lower part of cylinder 236, below piston member 234, is connected to the annulus between lands 222 and 224 by passageway 370, the lower part of the cylinder is then connected to return line 316 by the lower opening which is connected to the annulus between lands 222 and 224 and the annulus between lands 252 and 254. The annulus between lands 252 and 254 is connected to return line 316 by a passageway 318 and the annulus between lands 220 and 222. An opening in the bottom of the last-named annulus opens into the annulus formed between lands 252 and 254.

It can be seen that now the cylinder unit 204 along with the housing 205 will move upwardly as the pressure flows into the upper part of the cylinder 236 and is drained from the lower part. As the cylinder unit 204 and housing 205 move upwardly, the sleeve 218 which moves therewith repositions itself with respect to pilot valve 232 so that the opening entering into the annulus between lands 226 and 228 and the openings entering into the annulus between lands 222 and 224 are positioned over the lands 250 and 252, respectively (the respective positions shown in FIG. 3).

The operation of the other mechanism will now be described. As the pressure builds up in the annulus between projection 281 and land 230, the sleeve 218 is moved upwardly. As the sleeve 218 moves upwardly, the core 292 of the transducer moves from a null position and follows the movement of the sleeve and puts out a signal from the unit 290, which is fed back into the SAS to cancel out the signal being transmitted from the amplifier. As this is done, the upper opening which is connected to the annulus between lands 222 and 224 and engages the end of land 252 moves off of the land 252, and is connected to the annulus between land 250 and land 252. This permits the pressure in this annulus to pass through the opening into the annulus between lands 222 and 224 to passageway 370. From this passageway, the fluid pressure is directed into the lower part of cylinder 236 below piston member 234. Since the upper part of cylinder 236, above piston member 234, is connected to the annulus between lands 226 and 228 by passageway 372, the upper part of the cylinder is then connected to return line 316 by the upper opening which is connected to the annulus between lands 248 and 250. The annulus between lands 248 and 250 is connected to return line 316 by a passageway 900, the annulus between lands 252 and 254 and the annulus between lands 220 and 222. An opening in the bottom of the last-named annulus opens into the annulus formed between lands 252 and 254.

It can be seen that now the cylinder unit 204 along with housing 205 will move downwardly as the pressure flows into the lower part of the cylinder 236 and is drained from the upper part. As the cylinder unit 204 and housing 205 move downwardly, the sleeve 218 which moves therewith repositions itself with respect to pilot valve 232 so that the openings entering into the annulus between lands 222 and 224 and the openings entering into the annulus between lands 226 and 228 are positioned over the lands 52 and 250, respectively (the respective positions shown in FIG. 3).

Considering the second mode of operation, the pilot valve 232 is moved directly with cylinder 206. The movement of pilot valve 232 upwardly will connect pressure to the upper part of cylinder 236 above piston member 234 in the same manner as it did when sleeve member 218 was moved downwardly. It can be seen, however, that the movement of the pilot valve 232 will not impart a movement to the core 292 of the transducer unit 290.

The movement of the pilot valve 232 downwardly will connect pressure to the lower part of cylinder 236 below piston member 234 in the same manner as it did when sleeve member 218 was moved upwardly. Again, it can be seen that the movement of the pilot valve 232 will not impart a movement to the core 292 of the transducer unit 290. The unit in this mode acts merely as a servomechanism which in response to a manual movement responds with hydraulic actuation.

Considering the third mode of operation which is used when there is not an operating fluid pressure in conduit 308, it can be seen that a loss of pressure in conduit 308 will also cause a similar loss of pressure in passageway 312 and this loss permits spring 334 to move the valve body downwardly so as to connect passageway 320 with passageway 322. This permits the sleeve 218 to replace itself in its null position as shown in FIG. 3. The loss of pressure in conduit 308 also results in a loss of pressure in line 219 thereby permitting spring 241 to move the valve and cam member 240 upwardly. This movement of the member 240 permits both ends of the cylinder 236 on each side of the piston 234 to be connected by the passageway 239. The cam surface 251 is spring pressed against the cam followers 256 so as to bias them outwardly. When the annulus 384 is positioned over the ends of the cam followers, the cam surface 251 presses them into engagement with the annulus and they are held in position by the valve and cam member 240.

The authority of the SAS is limited to a percentage of total control by limiting the movement of sleeve 218. This movement is restricted between the movable lands 230 and 228 and fixed land 281 and is made less than the movement of the pilot valve 232. This pilot valve movement is governed by the travel of cylinder member 206 on extension 244. It is thus possible for the pilot to overrule the influence of the SAS by movement of the valve 218 in the desired direction of output.

It is to be understood that the invention is not limited to the specific description above or other specific figures, but may be used in other ways without departure from its spirit as defined by the following claims.

We claim:

1. A servo control mechanism having cooperating piston and cylinder elements, a piston rod connecting said piston element to fixed structure and means connecting the cylinder element to moveable structure, valve means, said valve means comprising a body, said body being connected to the cylinder element, a sleeve mounted for reciprocable movement in said body, a return, a source of pressure, relative movement of said sleeve and pilot valve from a null position connecting one end of said cylinder element to said source of pressure and the other end of said cylinder to said return, electrical means for actuating said sleeve, mechanical means for actuating said pilot valve, a cylindrical extension extending from the end of said cylinder element around the piston rod connecting said piston element to fixed structure, an annulus in said extension positioned coaxially with the piston rod, an annular member slideably mounted in said annulus, said mechanical means having an actuating cylinder, said actuating cylinder having one end slideably mounted on said cylindrical extension, means locking said actuating cylinder to said cylinder element for direct movement when said source of pressure is reduced a predetermined value, said locking means comprising a first annular groove around the inner face of the end of the actuating cylinder slideably mounted on said cylindrical extension, a cam follower positioned in an opening in the extension so that it is radially moveable therein, a second annular groove around the lower periphery of said annular member, said annular member being held in position by said source of pressure placing its second annular groove in line with said cam follower, said annular member being biased in its opposite direction when said pressure has been reduced a predetermined amount, a cam on said annular member limiting to move the cam follower outwardly when the annular member is being biased upwardly, said cam follower moving into said first annular groove when they are lined up and there is a reduction of pressure below a predetermined value.

2. A servo control mechanism having cooperating piston and cylinder elements; a piston rod connecting said piston element to fixed structure and means connecting the cylinder element to moveable structure; valve means; said valve means comprising a body, said body being connected to the cylinder element, a sleeve mounted for reciprocable movement in said body, and a pilot valve mounted for reciprocable movement in said sleeve; a return; a source of pressure; said pilot valve and sleeve having a null position; relative movement of said sleeve and pilot valve to each other from said null position connecting one end of said cylinder element to said source of pressure and the other end of said cylinder to said return; a first means for actuating said valve means; a second means for actuating said valve means; said first means being connected to said sleeve; said second means being connected to said pilot valve; means for deactivating said first means for actuating said valve means; means biasing said sleeve into a predetermined position with said body when said first means for actuating said valve means has been deactivated by said means for deactivating said first means; the range of movement of one of said means for actuating said valve means being greater than that of the other means for actuating said valve means whereby it has authority over the other means.

3. A servo control mechanism having cooperating piston and cylinder elements; a piston rod connecting said piston element to fixed structure and means connecting the cylinder element to moveable structure; valve means; said valve means comprising a body, said body being connected to the cylinder element, a sleeve mounted for reciprocable movement in said body, and a pilot valve mounted for reciprocable movement in said sleeve; a return; a source of pressure; said pilot valve and sleeve having a null position; relative movement of said sleeve and pilot valve to each other from said null position connecting one end of said cylinder element to said source of pressure and the other end of said cylinder to said return; a first means for actuating said valve means; a second means for actuating said valve means; said first means being connected to said sleeve; said second means being connected to said pilot valve; means for deactivating said first means for actuating said valve means; means biasing said sleeve into a predetermined position with said body when said first means for actuating said valve means has been deactivated by said means for deactivating said first means; the range of movement of said sleeve being less than that of the pilot valve whereby movement of the pilot valve has authority over the movement of the sleeve.

4. A servo control mechanism having cooperating piston and cylinder elements; a piston rod connecting said piston element to fixed structure and means connecting the cylinder element to moveable structure; valve means; said valve means comprising a body, said body being connected to the cylinder element, a sleeve mounted for reciprocable movement in said body, and a pilot valve mounted for reciprocable movement in said sleeve; a return; a source of pressure; said pilot valve and sleeve having a null position; relative movement of said sleeve and pilot valve to each other from said null position connecting one end of said cylinder element to said source of pressure and the other end of said cylinder to said return; a first means for actuating said valve means; a second means for actuating said valve means; said first means being connected to said sleeve; said second means being connected to said pilot valve; means for deactivating said first means for actuating said valve means; means biasing said sleeve into a predetermined position with said body when said first means for actuating said valve means has been deactivated by said means for deactivating said first means; said second means for actuating said valve means including a link axially aligned with said piston and cylinder elements, said link having one end guided on an extension of said cylinder element, and means connecting said link to said pilot valve; the range of movement of said sleeve being less than that of the pilot valve whereby movement of the pilot valve has authority over the movement of the sleeve.

5. A servo control mechanism having cooperating piston and cylinder elements; a piston rod connecting said piston element to fixed structure and means connecting the cylinder element to moveable structure; valve means; said valve means comprising a body, said body being connected to the cylinder element, a sleeve mounted for reciprocable movement in said body, and a pilot valve mounted for reciprocable movement in said sleeve; a return; a source of pressure; said pilot valve and sleeve having a null position; relative movement of said sleeve and pilot valve to each other from said null position connecting one end of said cylinder element to said source of pressure and the other end of said cylinder to said return; a first means for actuating said valve means; a second means for actuating said valve means; said first means being connected to said sleeve; said second means being connected to said pilot valve; means for deactivating said first means for actuating said valve means; means biasing said sleeve into a predetermined position with said body when said first means for actuating said valve means has been deactivated by said means for deactivating said first means; said second means for actuating said valve means including a link axially aligned with said piston and cylinder elements, said link having one end guided on an extension of said cylinder element, and means connecting said link to said pilot valve; means for fixing said link to said extension when said source of pressure is lost for moving said moveable structure directly; the range of movement of said sleeve being less than that of the pilot valve whereby movement of the pilot valve has authority over the movement of the sleeve.

References Cited by the Examiner

UNITED STATES PATENTS

| 2,929,362 | 3/1960 | Hayner | 91—216 |
| 3,120,155 | 2/1964 | Ayers | 91—391 |
| 3,122,972 | 3/1964 | Rasmussen | 91—391 |

FOREIGN PATENTS 1,137,854  1/1957  France.

SAMUEL LEVINE, *Primary Examiner.*

FRED E. ENGELTHALER, *Examiner.*

P. E. MASLOUSKY, *Assistant Examiner.*